US010689552B2

(12) United States Patent
Furuko et al.

(10) Patent No.: US 10,689,552 B2
(45) Date of Patent: Jun. 23, 2020

(54) BLOCK COPOLYMER COMPOSITION AND ADHESIVE COMPOSITION

(71) Applicant: ZEON CORPORATION, Chiyoda-ku, Tokyo (JP)

(72) Inventors: Ayako Furuko, Tokyo (JP); Sadaharu Hashimoto, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/761,222

(22) PCT Filed: Sep. 16, 2016

(86) PCT No.: PCT/JP2016/077417
§ 371 (c)(1),
(2) Date: Mar. 19, 2018

(87) PCT Pub. No.: WO2017/057050
PCT Pub. Date: Apr. 6, 2017

(65) Prior Publication Data
US 2018/0265755 A1 Sep. 20, 2018

(30) Foreign Application Priority Data

Sep. 30, 2015 (JP) .................................. 2015-195297

(51) Int. Cl.
*C09J 153/02* (2006.01)
*C08L 53/02* (2006.01)
*C08F 297/04* (2006.01)

(52) U.S. Cl.
CPC ......... *C09J 153/02* (2013.01); *C08F 297/046* (2013.01); *C08L 53/02* (2013.01); *C08L 2205/025* (2013.01)

(58) Field of Classification Search
CPC .... C08L 2205/02; C08L 53/02; C08L 101/12; C09J 153/02
See application file for complete search history.

(56) References Cited

U.S. PATENT DOCUMENTS

| 5,733,825 | A | * | 3/1998 | Martin | D01D 5/0885 |
|---|---|---|---|---|---|
| | | | | | 156/209 |
| 2002/0042235 | A1 | * | 4/2002 | Ueno | B32B 27/20 |
| | | | | | 442/227 |
| 2003/0180075 | A1 | * | 9/2003 | Hayami | G03G 15/2057 |
| | | | | | 399/328 |
| 2004/0242775 | A1 | | 12/2004 | Tahara et al. | |
| 2007/0078222 | A1 | * | 4/2007 | Chang | B32B 27/32 |
| | | | | | 525/88 |
| 2007/0240605 | A1 | * | 10/2007 | Iyer | C08L 23/10 |
| | | | | | 106/31.6 |
| 2008/0153970 | A1 | * | 6/2008 | Salazar | C08F 287/00 |
| | | | | | 524/505 |
| 2014/0350164 | A1 | * | 11/2014 | Oda | C09J 153/02 |
| | | | | | 524/505 |
| 2015/0284605 | A1 | * | 10/2015 | Dupont | C08F 293/00 |
| | | | | | 524/291 |

FOREIGN PATENT DOCUMENTS

| CN | 103998555 A | 8/2014 |
|---|---|---|
| EP | 3202844 A1 | 8/2017 |
| JP | 2001504519 A | 4/2001 |
| JP | 2012207127 A | 10/2012 |
| TW | 201333138 A | 8/2013 |
| WO | 9730844 A1 | 8/1997 |
| WO | 03020825 A1 | 3/2003 |
| WO | 2013099973 A1 | 7/2013 |

OTHER PUBLICATIONS

Apr. 3, 2018, International Preliminary Report on Patentability issued in the International Patent Application No. PCT/JP2016/077417.

Dec. 13, 2016, International Search Report issued in the International Patent Application No. PCT/JP2016/077417.

May 2, 2019, the Extended European Search Report issued by the European Patent Office in the corresponding European Patent Application No. 16851224.2.

* cited by examiner

*Primary Examiner* — Mark S Kaucher
(74) *Attorney, Agent, or Firm* — Kenja IP Law PC

(57) ABSTRACT

A main object of the present disclosure is to provide a block copolymer composition that allows an adhesive composition having excellent die-cutting properties, softening agent anti-migration performance, mandrel properties and transparency to be obtained. The object is achieved by providing a block copolymer composition comprising: a block copolymer A represented by the following formula (I); and a block copolymer B represented by the following formula (II); characterized in that: a content of an aromatic vinyl monomer unit of the block copolymer A is more than a content of an aromatic vinyl monomer unit of the block copolymer B; a weight average molecular weight of aromatic vinyl polymer block Ar3 (Mw(Ar3)) of the block copolymer B is substantially the same as a weight average molecular weight of aromatic vinyl polymer block Ar1 (Mw(Ar1)) of the block copolymer A; and breaking strength of the block copolymer composition is 8 MPa or less and breaking elongation of the block copolymer composition is 2000% or less.

5 Claims, No Drawings

BLOCK COPOLYMER COMPOSITION AND ADHESIVE COMPOSITION

TECHNICAL FIELD

The present invention relates to a block copolymer composition that allows an adhesive composition having excellent die-cutting properties, softening agent anti-migration performance, mandrel properties and transparency to be obtained.

BACKGROUND ART

Hot melt processable adhesive compositions are able to adhere to various products efficiently since they solidify in a short time, and are highly safe to human body since the adhesive compositions do not require solvents. Therefore, the adhesive compositions are used in a variety of fields.

Examples of the application of such an adhesive composition may include an adhesive label.

As a method for producing an adhesive label, usually adopted production method is to melt a hot melt adhesive, coat a substrate such as a release paper with the molten hot melt adhesive by a coating apparatus such as a die-coater, and process the obtained adhesive sheet by cutting thereof into a fixed size using a die-cutter to make a product.

In such a processing method, if the adhesive composition has low die-cutting properties; in particular, if problem occurs such that the adhesive composition forms threads when the adhesive sheet is cut by a die-cutter and the adhesive composition adheres to the die, problems such as remarkable deterioration in the product value of the adhesive label and the decrease in productivity.

For such a problem, for example, Patent Literature 1 describes an adhesive composition in which a styrene-isoprene diblock copolymer and a tackifier are blended in the substance such as a styrene-isoprene-styrene block copolymer.

Also, Patent Literature 2 describes, for example, an elastomer composition that contains an aromatic vinyl-isoprene block copolymer having two or more of a poly-aromatic vinyl block, an aromatic vinyl-isoprene diblock copolymer, and poly-isoprene respectively in a specific amount, and a content of an aromatic vinyl monomer unit is in a specific range.

CITATION LIST

Patent Literatures

Patent Literature 1: Japanese Unexamined Patent Publication No. JP2001-504519
Patent Literature 2: WO2003/020825

SUMMARY OF INVENTION

Technical Problem

Here, various properties are required for adhesive compositions, but as those properties, besides die-cutting properties, softening agent anti-migration performance, that is the property a softening agent does not easily bleed out since the softening agent blended to lower the processable temperature and to improve the tackiness, is prevented from bleeding out and contaminating the object to be adhered, and transparency are possibly required.

Also, as those properties, a mandrel property that is adhesive ability to the surface of a curvilinear solid when in a form of an adhesive label, may be required in some cases.

However, the adhesive compositions described in Patent Literature 1 and Patent Literature 2 have problems that the die-cutting properties are insufficient, and further, there are problems that it is difficult to fulfill all the properties of die-cutting properties, softening agent anti-migration performance, mandrel properties, and transparency at the same time.

The present invention is made in view of the above problems, and a main object thereof is to provide a block copolymer composition that allows an adhesive composition having excellent die-cutting properties, softening agent anti-migration performance, mandrel properties and transparency to be obtained.

Solution to Problem

The inventors of the present invention conducted a thorough investigation in order to achieve the object described above, and as a result, they found that, regarding a triblock copolymer of an aromatic vinyl polymer block—conjugated diene polymer block—aromatic vinyl polymer block, and a diblock copolymer of an aromatic vinyl polymer block—conjugated diene polymer block, when a particular configuration in which, the content of an aromatic vinyl monomer unit, the weight average molecular weight of the aromatic vinyl polymer block, and the breaking strength and the breaking elongation of a block copolymer composition including these block copolymers are in a specific range, is introduced, a block copolymer composition which can provide an adhesive composition having excellent die-cutting properties, softening agent anti-migration performance, mandrel properties and transparency, is obtained.

The present invention was completed based on this finding.

Thus, according to the present invention, there is provided a block copolymer composition comprising: a block copolymer A represented by the following formula (I); and a block copolymer B represented by the following formula (II); characterized in that: a content of an aromatic vinyl monomer unit of the block copolymer A is more than a content of an aromatic vinyl monomer unit of the block copolymer B; a weight average molecular weight of an aromatic vinyl polymer block Ar3 (Mw(Ar3)) of the block copolymer B is substantially the same as a weight average molecular weight of an aromatic vinyl polymer block Ar1 (Mw(Ar1)) of the block copolymer A; and breaking strength of the block copolymer composition is 8 MPa or less and breaking elongation of the block copolymer composition is 2000% or less.

Ar1-D1-Ar2     (I)

Ar3-D2     (II)

In the formula (I) and the formula (II), Ar1, Ar2, and Ar3 each represents an aromatic vinyl polymer block; and D1 and D2 each represents a conjugated diene polymer block.

In the block copolymer A, a ratio (Mw(Ar2)/Mw(Ar1)) of a weight average molecular weight of the aromatic vinyl polymer block Ar2 (Mw(Ar2)) to the weight average molecular weight of the aromatic vinyl polymer block Ar1 (Mw(Ar1)) is preferably in a range of 1 to 5.

It is preferable that the block copolymer B is prepared at the same time when the block copolymer A is prepared.

It is preferable that the block copolymer composition substantially does not contain halogen.

According to the present invention, there is provided an adhesive composition comprising: the above described block copolymer composition; and a softening agent.

Advantageous Effects of Invention

The present invention exhibits an effect of providing a block copolymer composition that allows an adhesive composition having excellent die-cutting properties, softening agent anti-migration performance, mandrel properties and transparency to be obtained.

DESCRIPTION OF EMBODIMENTS

The present invention relates to a block copolymer composition and an adhesive composition.

The block copolymer composition and the adhesive composition of the present invention are hereinafter described in details.

A. Block Copolymer Composition

The block copolymer composition of the present invention is a block copolymer composition comprising: a block copolymer A represented by the following formula (I); and a block copolymer B represented by the following formula (II); characterized in that: a content of an aromatic vinyl monomer unit of the block copolymer A is more than a content of an aromatic vinyl monomer unit of the block copolymer B; a weight average molecular weight of an aromatic vinyl polymer block Ar3 (Mw(Ar3)) of the block copolymer B is substantially the same as a weight average molecular weight of an aromatic vinyl polymer block Ar1 (Mw(Ar1)) of the block copolymer A; and breaking strength of the block copolymer composition is 8 MPa or less and breaking elongation of the block copolymer composition is 2000% or less.

Ar1-D1-Ar2            (I)

Ar3-D2            (II)

In the formula (I) and the formula (II), Ar1, Ar2, and Ar3 each represents an aromatic vinyl polymer block; and D1 and D2 each represents a conjugated diene polymer block.

According to the block copolymer composition of the present invention, when a content of an aromatic vinyl monomer unit of the block copolymer A is more than a content of an aromatic vinyl monomer unit of the block copolymer B, an adhesive composition having excellent transparency can presumably be obtained.

Also, when a weight average molecular weight of an aromatic vinyl polymer block Ar3 (Mw(Ar3)) of the block copolymer B is substantially the same as a weight average molecular weight of an aromatic vinyl polymer block Ar1 (Mw(Ar1)) of the block copolymer A, it is considered that the block copolymer composition has excellent compatibility of the block copolymer A with the block copolymer B. As the result, according to the block copolymer composition of the present invention, adhesive properties improve and an adhesive composition having excellent mandrel properties can be obtained. Further, the compatibility with a softening agent improves, and according to the block copolymer composition of the present invention, an adhesive composition having excellent softening agent anti-migration performance can be obtained.

Furthermore, when the breaking strength of the block copolymer composition is 8 MPa or less and the breaking elongation is 2000% or less, the block copolymer composition allows an adhesive composition having excellent die-cutting properties to be obtained.

The block copolymer composition of the present invention includes at least the block copolymer A and the block copolymer B.

The block copolymer composition of the present invention is hereinafter described in each constitution.

1. Block Copolymer A

The block copolymer A in the present invention is a triblock copolymer represented by the following general formula (I) and including two of an aromatic vinyl polymer block and one of a conjugated diene polymer block.

Ar1-D1-Ar2            (I)

In the formula (I), Ar1 and Ar2 each represents an aromatic vinyl polymer block; and D1 represents a conjugated diene polymer block.

(1) Aromatic Vinyl Polymer Block Ar1

The aromatic vinyl polymer block Ar1 in the block copolymer A is a polymer block containing an aromatic vinyl monomer unit as a main constituent unit. Examples of the aromatic vinyl monomer used to constitute the aromatic vinyl monomer unit of the aromatic vinyl polymer block Ar1 may include styrene; alkyl-substituted styrenes such as α-methylstyrene, o-methylstyrene, m-methylstyrene, p-methylstyrene, 2,4-dimethylstyrene, ethylstyrene, p-tert-butylstyrene; halogen-substituted styrenes such as 4-chlorostyrene, 2-bromostyrene, 3,5-difluorostyrene; and alkoxy-substituted styrenes such as 4-methoxystyrene and 3,5-dimethoxystyrene. Among these, as the aromatic vinyl monomer, from the viewpoint of allowing the block copolymer composition to have low water absorbency and excellent transparency, aromatic vinyl monomers not containing halogen is preferable, and among them, from the viewpoint of improving the adhesiveness and the die-cutting properties of the block copolymer composition thus obtainable and commercial availability, styrene and alkyl-substituted styrene are preferable, and styrene is particularly preferable.

These aromatic vinyl monomers may be used each singly or in combination of two or more kinds thereof, in the aromatic vinyl polymer block Ar1.

The aromatic vinyl polymer block Ar1 may include a monomer unit other than the aromatic vinyl monomer unit. Examples of the monomer that constitutes the monomer unit other than the aromatic vinyl monomer unit that can be included in the aromatic vinyl polymer block Ar1 may include, conjugated diene monomers such as 1,3-butadiene, isoprene, 2,3-dimethyl-1,3-butadiene, and 1,3-pentadiene.

The content of the monomer unit other than the aromatic vinyl monomer unit in the aromatic vinyl polymer block Ar1 is preferably 20% by mass or less, more preferably 10% by mass or less, and particularly preferably substantially 0% by mass.

The weight average molecular weight of the aromatic vinyl polymer block Ar1 (Mw(Ar1)) is not particularly limited, and usually, it may be in a range of 5000 to 100000, is preferably in a range of 6000 to 50000, and more preferably in a range of 7000 to 30000. If the Mw(Ar1) is too small, there is a risk that the adhesive composition obtainable using this block copolymer composition may have low holding power as an adhesive, and if it is too large, there is a risk that the melt viscosity of the adhesive composition may increase markedly.

Also, when the weight average molecular weight is in the range described above, the block copolymer composition has high cohesiveness and an adhesive composition using the block copolymer composition can have excellent softening agent anti-migration performance.

Incidentally, in the present invention, the weight average molecular weight (Mw) and the number average molecular weight (Mn) of materials such as polymer blocks and block copolymer compositions are determined as a value measured by high performance liquid chromatography and calculated relative to polystyrene standards.

For the measurement of the weight average molecular weight and the number average molecular weight, in more particular, the values may be determined as a molecular weight calculated relative to polystyrene standards, by high performance liquid chromatography using tetrahydrofuran as a carrier at a flow rate of 0.35 ml/min. The measurement may be carried out by a device HLC8220™ manufactured by Tosoh Corporation, with three connected columns of SHODEX™ (registered trademark) KF-404HQ manufactured by SHOWA DENKO K.K (column temperature 40° C.), and a differential refractometer and an ultraviolet detector as detectors, and using twelve samples of polystyrene standards (from 500 to 3,000,000) manufactured by Polymer Laboratories Ltd. for the calibration of the molecular weight.

The molecular weight distribution that is the ratio (Mw(Ar1)/Mn(Ar1)) of the weight average molecular weight (Mw(Ar1)) to the number average molecular weight (Mn(Ar1)) of the aromatic vinyl polymer block Ar1 is preferably 1.5 or less, and more preferably 1.2 or less. If the ratio is small, the block copolymer composition allows an adhesive composition having more excellent holding power at a high temperature to be obtained.

(2) Conjugated Diene Polymer Block D1

The conjugated diene polymer block D1 in the block copolymer A is a polymer block containing a conjugated diene monomer unit as a main constituent unit. The conjugated diene monomer used to constitute the conjugated diene monomer unit of the conjugated diene polymer block D1 is not particularly limited if it is a conjugated diene compound, and examples thereof may include 1,3-butadiene, isoprene, 2,3-dimethyl-1,3-butadiene, 2-chloro-1,3-butadiene, 1,3-pentadiene, and 1,3-hexadiene. Among these, as the conjugated diene monomer, from the viewpoint of allowing the block copolymer composition to have low water absorbency and excellent transparency, conjugated diene monomers not containing halogen are preferable, and among them, it is preferable to use 1,3-butadiene and/or isoprene, and it is particularly preferable to use isoprene. When the conjugated diene polymer block D1 is formed from an isoprene unit, the block copolymer composition allows an adhesive composition having excellent adhesiveness and flexibility to be obtained.

These conjugated diene monomers can be respectively used singly or in combination of two or more kinds thereof in the conjugated diene polymer block D1.

In addition, some of the unsaturated bonds of the conjugated diene polymer block D1 may be subjected to a hydrogenation reaction.

The conjugated diene polymer block D1 may include a monomer unit other than the conjugated diene monomer unit. Examples of the monomer that constitutes the monomer unit other than the conjugated diene monomer unit that can be included in the conjugated diene polymer block D1 may include, aromatic vinyl monomers such as styrene and α-methylstyrene, α,β-unsaturated nitrile monomers, unsaturated carboxylic acid or acid anhydride monomers, unsaturated carboxylic acid ester monomers, and non-conjugated diene monomers. The content of the monomer unit other than the conjugated diene monomer unit in the conjugated diene polymer block D1 is preferably 20% by mass or less, more preferably 10% by mass or less, and particularly preferably substantially 0% by mass.

The content of the monomer unit having vinyl bond in the monomer unit in the conjugated diene polymer block D1 is not particularly limited, but usually 50% by mass or less, preferably 20% by mass or less, and above all, preferably in a range of 5% by mass to 10% by mass. If the content of the monomer unit having vinyl bond is in this range, the block copolymer composition allows an adhesive composition having more excellent initial tack strength at a low temperature to be obtained.

The weight average molecular weight of the conjugated diene polymer block D1 (Mw(D1)) is not particularly limited, but may usually be in a range of 70000 to 190000, is preferably in a range of 80000 to 160000, and above all, preferably in a range of 85000 to 140000. If the Mw(D1) is too small, the block copolymer composition may give the adhesive composition thus obtainable inferior holding power at a high temperature, and if it is too large, the melt viscosity increases which makes the management difficult.

The molecular weight distribution (Mw(D1)/Mn(D1)) that is the ratio of the weight average molecular weight (Mw(D1)) to the number average molecular weight (Mn(D1)) of the conjugated diene polymer block D1 is preferably 1.5 or less, and more preferably 1.2 or less. If the molecular weight distribution is small, the block copolymer composition allows an adhesive composition having more excellent holding power at a high temperature to be obtained.

(3) Aromatic Vinyl Polymer Block Ar2

The aromatic vinyl polymer block Ar2 in the block copolymer A is a polymer block containing an aromatic vinyl monomer unit as a main constituent unit.

Also, the aromatic vinyl polymer block Ar2 in the block copolymer A may include a monomer unit other than the aromatic vinyl monomer unit.

Such an aromatic vinyl monomer used to constitute the aromatic vinyl monomer unit of the aromatic vinyl polymer block Ar2, the monomer that constitutes the monomer unit other than the aromatic vinyl monomer, and the content of the monomer unit other than the aromatic vinyl monomer may be in the same contents as those described in the section "(1) Aromatic vinyl polymer block Ar1" above, thus the descriptions herein are omitted.

The weight average molecular weight of the aromatic vinyl polymer block Ar2 (Mw(Ar2)) may be larger than the weight average molecular weight of the aromatic vinyl polymer block Ar1 (Mw(Ar1)) included in the block copolymer A, and may be in the same level.

In the present invention, a ratio (Mw(Ar2)/Mw(Ar1)) of the weight average molecular weight of the aromatic vinyl polymer block Ar2 (Mw(Ar2)) to the weight average molecular weight of the aromatic vinyl polymer block Ar1 (Mw(Ar1)) is preferably in a range of 1 to 5, and among this, preferably in a range of 1.2 to 4, and particularly preferably in a range of 1.5 to 3. When the ratio of the weight average molecular weight is in the range described above, the block copolymer composition allows an adhesive composition having excellent transparency to be obtained.

Also, when the ratio of the weight average molecular weight is in the range described above, and the weight average molecular weight of the aromatic vinyl polymer block Ar2 is set large, the block copolymer composition has high cohesiveness, and an adhesive composition using the block copolymer composition can have excellent softening agent anti-migration performance.

The weight average molecular weight of the aromatic vinyl polymer block Ar2 (Mw(Ar2)) is not particularly limited, and may usually be in a range of 5000 to 100000, is preferably in a range of 9000 to 70000, and more preferably in a range of 10000 to 50000. If Mw(Ar2) is too small, there is a risk that the block copolymer composition gives an obtainable adhesive composition high melt viscosity at relatively low temperatures, and if Mw(Ar2) is too large, it is difficult to produce the block copolymer A in some cases.

Also, when the weight average molecular weight is in the range described above, the block copolymer composition has high cohesiveness, and an adhesive composition using the block copolymer composition can have excellent softening agent anti-migration performance.

The molecular weight distribution (Mw(Ar2)/Mn(Ar2)) that is the ratio of the weight average molecular weight (Mw(Ar2)) to the number average molecular weight (Mn(Ar2)) of the aromatic vinyl polymer block Ar2 is preferably 1.5 or less, and more preferably 1.2 or less. If the ratio is small, the block copolymer composition allows an adhesive composition having excellent holding power at a high temperature to be obtained.

(4) Block Copolymer A

The weight average molecular weight of the block copolymer A (MwA) may usually be in a range of 80000 to 400000, is preferably in a range of 90000 to 300000, and among this, preferably in a range of 100000 to 250000, and particularly preferably in a range of 110000 to 220000. If the weight average molecular weight is too small, the block copolymer composition may give the adhesive composition thus obtainable inferior holding power at a high temperature, and if it is too large, the melt viscosity tends to increase, which makes the management difficult.

The molecular weight distribution (Mw/Mn) of the block copolymer A is preferably 1.5 or less, and more preferably 1.2 or less. When the ratio is small, the block copolymer composition allows an adhesive composition having more excellent holding power at a high temperature to be obtained.

The aromatic vinyl monomer unit content of the block copolymer A (content of the aromatic vinyl monomer unit relative to all monomer units that constitute the block copolymer A) may be usually in a range of 15% by mass to 75% by mass, is preferably in a range of 17% by mass to 60% by mass, and among this, preferably in a range of 20% by mass to 50% by mass. When the content is in such a range, the block copolymer composition efficiently allows an adhesive composition having excellent adhesion and die-cutting properties to be obtained.

The aromatic vinyl monomer unit content of the block copolymer A is more than the content of the aromatic vinyl monomer unit of the block copolymer B.

In the present invention, the ratio of the aromatic vinyl monomer unit content of the block copolymer A relative to the aromatic vinyl monomer unit content of the block copolymer B (the aromatic vinyl monomer unit content of the block copolymer A/the aromatic vinyl monomer unit content of the block copolymer B) is preferably in a range of 1.1 to 5, and among them, preferably in a range of 1.5 to 4, and particularly preferably in a range of 1.75 to 3.5. When the ratio is in the range described above, the block copolymer composition allows an adhesion composition having excellent transparency to be obtained.

The content of the block copolymer A in the block copolymer composition may be usually in a range of 10% by mass to 90% by mass, is preferably in a range of 15% by mass to 60% by mass, and among this, preferably in a range of 20% by mass to 50% by mass. If the content is too small, the block copolymer composition may give the adhesive composition obtainable using this block copolymer composition inferior holding power at a high temperature, and on the contrary, if it is too large, the adhesive composition may have inferior initial tack strength and die-cutting properties.

Incidentally, the block copolymer A that constitutes the block copolymer composition of the present invention may be composed of only one kind of block copolymer A having a substantially single configuration, or may be composed of two or more kinds of block copolymer A having substantially different configurations.

2. Block Copolymer B

The block copolymer B in the present invention is a diblock copolymer represented by the following general formula (II), the diblock copolymer having one of an aromatic vinyl polymer block and one of a conjugated diene polymer block.

Ar3-D2                                    (II)

In the formula (II), Ar3 represents an aromatic vinyl polymer block, and D2 represents a conjugated diene polymer block.

(1) Aromatic Vinyl Polymer Block Ar3

The weight average molecular weight of aromatic vinyl polymer block Ar3 (Mw(Ar3)) constituting the block copolymer B is substantially the same as the weight average molecular weight of the aromatic vinyl polymer block Ar1 in the block copolymer A (Mw(Ar1)).

Here, the weight average molecular weight is substantially the same means that the ratio of the weight average molecular weight of the both (Mw(Ar3)/Mw(Ar1)) may be in a range of 0.95 to 1.05, and among this, is preferably in a range of 0.98 to 1.02, and particularly preferably 1.00. The ratio of the weight average molecular weight allows the block copolymer composition to have more excellent compatibility of the block copolymer A with the block copolymer B.

The monomer used to constitute the monomer unit that forms the aromatic vinyl polymer block Ar3 may be in the same contents as those described in "(1) Aromatic vinyl polymer block Ar1" in the section "1. Block copolymer A" above.

In the present invention, the kind of the monomer used to constitute the monomer unit that forms the aromatic vinyl polymer block Ar3 is preferably the same as the kind of the monomer used to constitute the monomer unit that forms the aromatic vinyl polymer block Ar1; above all, the content ratio of each of the various monomer units used to constitute the aromatic vinyl polymer block Ar3 is preferably substantially the same as the content ratio of the various monomer units used to constitute the aromatic vinyl polymer block Ar1. When the constituent materials of the aromatic vinyl polymer block Ar3 are substantially the same as those of the aromatic vinyl polymer block Ar1 in the block copolymer A, the block copolymer composition can have more excellent compatibility of the block copolymer A with the block copolymer B.

Here, when the content ratio is substantially the same, regarding each of the monomer unit, the ratio of the content of each other may be the same as the ratio of the weight average molecular weight when the weight average molecular weight is substantially the same.

The molecular weight distribution (Mw(Ar3))/Mn(Ar3)) that is the ratio of the weight average molecular weight (Mw(Ar3)) to the number average molecular weight of the aromatic vinyl polymer block Ar3 (Mw(Ar3)) may be the same as molecular weight distribution (Mw(Ar1))/Mn(Ar1)) described in "(1) Aromatic vinyl polymer block Ar1" in the section "1. Block copolymer A" above.

In the present invention, the molecular weight distribution of the aromatic vinyl polymer block Ar3 is preferably substantially the same as the molecular weight distribution of the aromatic vinyl polymer block Ar1. When the molecular weight distribution of the aromatic vinyl polymer block Ar3 is substantially the same as that of the aromatic vinyl polymer block Ar1, the block copolymer composition can have more excellent compatibility of the block copolymer A with the block copolymer B.

Here, when the molecular weight distribution is substantially the same, the ratio of the molecular weight distribution of the both may be the same as the ratio of the weight average molecular weight when the weight average molecular weight is substantially the same.

(2) Conjugated Diene Polymer Block D2

The conjugated diene polymer block D2 of the block copolymer B may be in the same contents as those described in "(2) Conjugated diene polymer block D1" in the section "1. Block copolymer A" above.

In the present invention, the kind of the monomer used to constitute the monomer unit that forms the conjugated diene polymer block D2 is preferably the same as the kind of the monomer used to constitute the monomer unit that forms the conjugated diene polymer block D1; above all, the content ratio of each of the various monomer units used to constitute the conjugated diene polymer block D2 is preferably substantially the same as the content ratio of the various monomer units used to constitute the conjugated diene polymer block D1. When the constituent materials of the conjugated diene polymer block D2 are substantially the same as those of the conjugated diene polymer block D1 of the block copolymer A, the block copolymer composition can have more excellent compatibility of the block copolymer A with the block copolymer B.

In the present invention, the weight average molecular weight of the conjugated diene polymer block D2 (Mw(D2)) is preferably substantially the same as the weight average molecular weight of the conjugated diene polymer block D1 (Mw(D1)).

Also, the molecular weight distribution of the conjugated diene polymer block D2 (Mw(D2)/Mn(D2)) is preferably substantially the same as the molecular weight distribution of the conjugated diene polymer block D1 (Mw(D1)/Mn(D1)).

When the weight average molecular weight and the molecular weight distribution of the conjugated diene polymer block D2 are substantially the same as those of the conjugated diene polymer block D1 of the block copolymer A, the block copolymer composition can have more excellent compatibility of the block copolymer A with the block copolymer B.

Incidentally, when the content ratio, the weight average molecular weight and the molecular weight distribution are substantially the same, each of the ratio of the content, the ratio of the weight average molecular weight, and the ratio of the molecular weight distribution may be in the same contents as those described in the section "(1) Aromatic vinyl polymer block Ar3" above.

(3) Block Copolymer B

The weight average molecular weight of the block copolymer B (MwB) may usually be in a range of 80000 to 300000, is preferably in a range of 85000 to 250000, and among this, preferably in a range of 90000 to 230000, and particularly preferably in a range of 95000 to 200000. If the weight average molecular weight is too small, the block copolymer composition may give the adhesive composition obtainable using this block copolymer composition inferior holding power at a high temperature, and if it is too large, the melt viscosity tends to increase which makes the management difficult.

The molecular weight distribution (Mw/Mn) of the block copolymer B is preferably 1.5 or less, and more preferably 1.2 or less. When the ratio is small, the block copolymer composition allows an adhesive composition having more excellent holding power at a high temperature to be obtained.

The aromatic vinyl monomer unit content in the block copolymer B (content of the aromatic vinyl monomer unit relative to all monomer units that constitute the block copolymer B) may be usually in a range of 8% by mass to 50% by mass, is preferably in a range of 10% by mass to 40% by mass, and preferably in a range of 12% by mass to 30% by mass. When the content is in such a range, the block copolymer composition efficiently allows an adhesive composition having excellent adhesion and die-cutting properties to be obtained.

The content of the block copolymer B in the block copolymer composition may be usually in a range of 10% by mass to 90% by mass, is preferably in a range of 20% by mass to 85% by mass, and among this, preferably in a range of 30% by mass to 80% by mass. If the content is too small, the block copolymer composition may give the adhesive composition obtainable using this block copolymer composition inferior holding power at a high temperature, and on the contrary, if it is too large, the adhesive composition may have inferior initial tack strength and die-cutting properties.

Incidentally, the block copolymer B that constitutes the block copolymer composition of the present invention may be composed of only one kind of block copolymer B having a substantially single configuration, or may be composed of two or more kinds of block copolymer B having substantially different configurations.

In the present invention, the block copolymer B is preferably prepared at the same time when the block copolymer A is prepared.

Here, prepared at the same time when the block copolymer A is prepared means that, in particular, as described in the section "4. Method for producing block copolymer composition" later, first, after obtaining the block copolymer B, the block copolymer A is obtained by a method in which the end of some of the block copolymer B is connected to the aromatic vinyl polymer block Ar2; the aromatic vinyl polymer block Ar1 and the conjugated diene polymer block D1 of the block copolymer A are obtained by polymerizing, as the raw materials, the same monomer units of the aromatic vinyl polymer block Ar3 and the conjugated diene polymer block D2 of the block copolymer B.

3. Block Copolymer Composition

The block copolymer composition may be a copolymer composed of only the block copolymer A and the block copolymer B, but may include a block copolymer other than the block copolymer A and the block copolymer B. Examples of such a block copolymer may include but is not limited to an aromatic vinyl—conjugated diene—aromatic vinyl triblock copolymer having a different constitution from that of the block copolymer A and a radial aromatic vinyl-conjugated diene block copolymer. In the block copolymer components, the content of the block copolymer other than the block copolymer A and the block copolymer B is preferably 20% by mass or less, and more preferably 10% by mass or less.

In the block copolymer components including the block copolymer A, the block copolymer B, and optionally a block copolymer other than the block copolymer A and the block copolymer B, the content of the aromatic vinyl monomer unit relative to all the block copolymer components of the said block copolymer (in the following descriptions, may be referred to as "overall content of aromatic vinyl monomer unit") may be in a range of 10% by mass to 50% by mass, is preferably in a range of 13% by mass to 40% by mass, preferably in a range of 15% by mass to 37% by mass, and more preferably in a range of 17% by mass to 35% by mass. If the overall content of aromatic vinyl monomer units is too small, there is a risk that the block copolymer composition may give the adhesive composition thus obtainable inferior holding power as an adhesive, and if the content is too large, the adhesive composition thus obtainable may become too hard, and may have an inferior adhesion level.

This overall content of the aromatic vinyl monomer units can be easily adjusted by adjusting the amounts of incorporation of the various block copolymers while considering the contents of the aromatic vinyl monomer units in the various block copolymers that constitute the block copolymer composition. Incidentally, in a case all of the polymer components that constitute the block copolymer composition are composed only of aromatic vinyl monomer units and conjugated diene monomer units, when the block copolymers are subjected to ozone decomposition and then to reduction by lithium aluminum hydride according to the method described in Rubber Chem. Technol., 45, 1295 (1972), the conjugated diene monomer unit moieties are decomposed and only the aromatic vinyl monomer unit moieties can be extracted. Therefore, the overall content of aromatic vinyl monomer units can be measured easily.

The weight average molecular weight (Mw) of the overall block copolymer composition, that is the weight average molecular weight of the overall block copolymer components including the block copolymer A, the block copolymer B, and optionally a block copolymer other than the block copolymer A and the block copolymer B, needs to be in a range of 80000 to 400000, is preferably in a range of 85000 to 280000, and preferably in a range of 90000 to 250000. When the weight average molecular weight is in the range described above, the block copolymer composition can form an adhesive composition having excellent hot melt properties and heat resistance stability.

Also, the molecular weight distribution (Mw/Mn) represented by the ratio of this weight average molecular weight (Mw) to the number average molecular weight (Mn) of the overall block copolymer composition is not particularly limited, and is usually in a range of 1.01 to 10, preferably in a range of 1.02 to 5, and more preferably in a range of 1.03 to 3.

The block copolymer composition preferably substantially does not contain halogen.

Here, substantially does not contain halogen means that the halogen content in the block copolymer composition may be 0.5% by mass or less, is preferably 0.1% by mass or less, and preferably 0% by mass. When the composition substantially does not contain halogen, the block copolymer composition can have low water absorbency and excellent transparency.

Incidentally, examples of the method for decreasing the halogen content in the block copolymer composition may include a method to decrease the amount of use of the monomer including halogen as the monomer used to constitute the monomer unit that forms various block copolymers in the block copolymer composition, and when various block copolymers are obtained using a coupling agent, a method to decrease the amount of use of the coupling agent including halogen.

The breaking strength of the block copolymer composition is 8 MPa or less, and the breaking elongation of the block copolymer composition is 2000% or less.

In the present invention, the breaking strength of the block copolymer composition may be 8 MPa or less, and is preferably 7.8 MPa or less, more preferably 7.6 MPa or less, and further preferably 7.5 MPa or less.

Also, the breaking elongation of the block copolymer composition may be 2000% or less, less than 1800%, is preferably less than 1500%, more preferably less than 1400%, and further preferably less than 1300%.

When the breaking strength and the breaking elongation of the block copolymer composition are in the range described above, the block copolymer composition allows an adhesive composition having excellent die-cutting properties to be obtained.

Incidentally, the breaking strength and the breaking elongation may be obtained by, respectively, using a 0.7 mm thick sheet of the block copolymer composition pressure-molded at 170° C., and measuring the tensile strength upon cutting and the elongation upon cutting at the elastic stress rate of 100 m/min according to JIS K 6251.

4. Method for Producing Block Copolymer Composition

There are no particular limitations on the method for producing the block copolymer composition of the present invention. For example, the block copolymer composition can be produced by separately producing each of the block copolymers according to a conventional polymerization method, and mixing those block copolymers by a conventional method such as kneading or solution mixing.

In the present invention, from the viewpoint of obtaining the block copolymer composition with excellent compatibility of the block copolymer A with the block copolymer B, the production method is preferably a method as described next, after obtaining the block copolymer B, the block copolymer A is obtained by a method in which the end of some of the block copolymer B is connected to the aromatic vinyl polymer block Ar2; in other words, a method in which the block copolymer B is prepared at the same time when the block copolymer A is prepared.

That is, the block copolymer component comprising the block copolymer A and the block copolymer B used in the present invention is preferably produced using a production method including the following steps (1) to (5).

(1): A step of polymerizing an aromatic vinyl monomer in a solvent using a polymerization initiator.

(2): A step of adding a conjugated diene monomer to the solution containing an aromatic vinyl polymer having an active terminal as obtained in the above step (1).

(3): A step of adding a polymerization terminator to the solution containing an aromatic vinyl-conjugated diene block copolymer having an active terminal as obtained in the above step (2), such that the amount of the polymerization terminator would be less than 1 molar equivalent with respect to the active terminal of the aromatic vinyl-conjugated diene block copolymer having an active terminal, and forming a block copolymer B.

(4): A step of adding an aromatic vinyl monomer to the solution obtained in the above step (3), and forming a block copolymer A.

(5): A step of collecting polymer components from the solution obtained in the above step (4).

In the production method described above, first, an aromatic vinyl monomer is polymerized in a solvent using a polymerization initiator (Step (1)). Regarding the polymerization initiator that may be used, an organic alkali metal compound, an organic alkaline earth metal compound, an organic lanthanoid-based rare earth metal compound and the like, which are generally known to have anionic polymerization activity for aromatic vinyl monomers and conjugated diene monomers, can be used. For the organic alkali metal compound, an organolithium compound having one or more lithium atoms in the molecule is particularly suitably used, and specific examples thereof may include organic monolithium compounds such as ethyllithium, n-propyllithium, isopropyllithium, n-butyllithium, sec-butyllithium, t-butyllithium, hexyllithium, phenyllithium, stilbene lithium, dialkylaminolithium, diphenylaminolithium, and ditrimethylsilylaminolithium; organic dilithium compounds such as methylenedilithium, tetramethylenedilithium, hexamethylenedilithium, isoprenyldilithium, and 1,4-dilithio-ethylcyclohexane; and organic trilithium compounds such as 1,3,5-trilithiobenzene. Among these, organic monolithium compounds are particularly suitably used.

Examples of the organic alkaline earth metal compound that is used as a polymerization initiator may include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate, and ethylbarium. Furthermore, specific examples of other polymerization initiators may include compounds that form a uniform system in organic solvent and have living polymerizability, such as composite catalysts formed from lanthanoid-based rare earth metal compounds including neodymium, samarium and gadolinium/alkylaluminum/alkylaluminum halide/alkylaluminum hydride; and metallocene type catalysts including titanium, vanadium, samarium, and gadolinium. Incidentally, these polymerization initiators may be used singly, or two or more kinds thereof may be used in mixture.

The amount of use of the polymerization initiator may be determined in accordance with the molecular weights of the various intended block copolymers and are not particularly limited. However, the amount of use is usually 0.01 millimole to 20 millimoles, preferably 0.05 millimole to 15 millimoles, and more preferably 0.1 millimole to 10 millimoles, per 100 g of all the monomers used.

The solvent used for the polymerization is not particularly limited as long as it is inert to the polymerization initiator, and for example, chain-like hydrocarbon solvents, cyclic hydrocarbon solvents, or solvent mixtures thereof are used. Examples of the chain-like hydrocarbon solvents may include chain-like alkanes and alkenes having 4 to 6 carbon atoms, such as n-butane, isobutane, 1-butene, isobutylene, trans-2-butene, cis-2-butene, 1-pentene, trans-2-pentene, cis-2-pentene, n-pentane, isopentane, neopentane, and n-hexane. Also, specific examples of the cyclic hydrocarbon solvents may include aromatic compounds such as benzene, toluene, and xylene; and alicyclic hydrocarbon compounds such as cyclopentane and cyclohexane. These solvents may be used singly, or two or more kinds thereof may be used in mixture.

The amount of the solvent used for polymerization is not particularly limited, but the amount is set such that the total concentration of the block copolymers in the solution obtainable after the polymerization reaction would be usually 5% by mass to 60% by mass, preferably 10% by mass to 55% by mass, and more preferably 20% by mass to 50% by mass.

In order to control the structures of the various polymer blocks of the various block copolymers, a Lewis base compound may be added to the reactor used for the polymerization. Examples of this Lewis base compound may include ethers such as tetrahydrofuran, diethyl ether, dioxane, ethylene glycol dimethyl ether, ethylene glycol dibutyl ether, diethylene glycol dimethyl ether, and diethylene glycol dibutyl ether; tertiary amines such as tetramethylethylenediamine, trimethylamine, triethylamine, pyridine, and quinuclidine; alkali metal alkoxides such as potassium t-amyl oxide and potassium t-butyl oxide; and phosphines such as triphenylphosphine. These Lewis base compounds are respectively used singly or in combination of two or more kinds thereof, and are appropriately selected to the extent that the purposes of the present invention are not impaired.

Furthermore, the timing for adding the Lewis base compound at the time of the polymerization reaction is not particularly limited, and may be appropriately determined in accordance with the intended structures of the various block copolymers. For example, the Lewis base compound may be added in advance before polymerization is initiated, may be added after a portion of the polymer blocks have been polymerized, or may be added in advance before polymerization is initiated and then further added after a portion of the polymer blocks have been polymerized.

The polymerization reaction temperature is usually 10° C. to 150° C., preferably 30° C. to 130° C., and more preferably 40° C. to 90° C. The time required for polymerization may vary with the conditions, but the time for the polymerization reaction is usually 48 hours or less, and preferably 0.5 hour to 10 hours. The polymerization pressure is not particularly limited, and polymerization may be carried out in a pressure range sufficient for maintaining the monomers and the solvent in a liquid state in the polymerization temperature range mentioned above.

When an aromatic vinyl monomer is polymerized in a solvent using a polymerization initiator under the conditions such as described above, a solution containing an aromatic vinyl polymer having an active terminal can be obtained. This aromatic vinyl polymer having an active terminal constitutes the aromatic vinyl polymer block (Ar1) of the block copolymer A and the aromatic vinyl polymer block (Ar3) of the block copolymer B. Therefore, the amount of the aromatic vinyl monomer used at this time is determined depending on the intended weight average molecular weights of these polymer blocks.

The next step is a step of adding a conjugated diene monomer to the solution containing an aromatic vinyl polymer having an active terminal that is obtained as described above (Step (2)). Through this addition of a conjugated diene monomer, a conjugated diene polymer chain is formed from the active terminal, and thus a solution containing an aromatic vinyl-conjugated diene block copolymer having an active terminal is obtained. The amount of the conjugated diene monomer used at this time is determined such that the resulting conjugated diene polymer chain would have the intended weight average molecular weights of the conjugated diene polymer block (D1) of the block copolymer A and the conjugated diene polymer block (D2) of the block copolymer B.

In the subsequent step, a polymerization terminator is added to the solution containing an aromatic vinyl-conjugated diene block copolymer having an active terminal that is obtained as described above, such that the amount of the polymerization terminator would be less than 1 molar equivalent with respect to the active terminal of the aromatic vinyl-conjugated diene block copolymer having an active terminal (Step (3)). When a polymerization terminator is added to the solution containing an aromatic vinyl-conjugated diene block copolymer having an active terminal, the active terminal of the aromatic vinyl-conjugated diene block copolymer having an active terminal is deactivated, and as a result, the block copolymer B, which is an aromatic vinyl-conjugated diene diblock copolymer, is formed.

There are no particular limitations on the polymerization terminator that is added in this step, and any conventionally known polymerization terminator can be used without any particular limitations. Examples of polymerization terminators that are particularly suitably used may include alcohols such as methanol, ethanol, propanol, butanol, and isopropanol.

The amount of the polymerization terminator that is added in this step needs to be adjusted to an amount of less than 1 molar equivalent with respect to the active terminal of the aromatic vinyl-conjugated diene block copolymer having an active terminal. It is because in order to carry out the process for forming the block copolymer A, which is a subsequent step, it is necessary to cause the aromatic vinyl-conjugated diene block copolymer having an active terminal to remain in the solution. The amount of the polymerization terminator is preferably 0.10 molar equivalents to 0.90 molar equivalents, and more preferably 0.15 molar equivalents to 0.70 molar equivalents, with respect to the active terminal of the polymer. Incidentally, since the amount of the polymerization terminator that is added in this step determines the amount of the block copolymer B, the amount of the polymerization terminator may be determined according to the intended composition of the block copolymer components.

There are no particular limitations on the reaction conditions for the polymerization termination reaction, and usually, the reaction conditions may be set up to the same extent as the polymerization reaction conditions described above.

In the subsequent step, an aromatic vinyl monomer is added to the solution that is obtained as described above (Step (4)). When an aromatic vinyl monomer is added to the solution, an aromatic vinyl polymer chain is formed from the terminal of the aromatic vinyl-conjugated diene block copolymer having an active terminal that remained without reacting with the polymerization terminator. This aromatic vinyl polymer chain constitutes the aromatic vinyl polymer block (Ar2) of the block copolymer A. Therefore, the amount of the aromatic vinyl monomer used at this time is determined in accordance with the intended weight average molecular weight of the aromatic vinyl polymer block (Ar2). Through this process for adding an aromatic vinyl monomer, the aromatic vinyl-conjugated diene-aromatic vinyl triblock copolymer that constitutes the block copolymer A is formed, and as a result, a solution containing the block copolymer A and the block copolymer B is obtained. Incidentally, a conjugated diene monomer may be added to the solution containing an aromatic vinyl-conjugated diene block copolymer having an active terminal that did not react with the polymerization terminator, before this step of adding an aromatic vinyl monomer. As such, when a conjugated diene monomer is added, the weight average molecular weight of the conjugated diene polymer block (D1) of the block copolymer A can be made larger compared to the case of not adding the conjugated diene monomer.

In the subsequent step, the intended polymer components are collected from the solution that is obtained as described above (Step (5)). The method for collection may be carried out according to a conventional method, and there are no particular limitations. For example, the polymer components can be collected by adding, if necessary, a polymerization terminator such as water, methanol, ethanol, propanol, hydrochloric acid or citric acid after completion of the reaction, further adding additives such as an antioxidant as necessary, and applying a known method such as a direct drying method or steam stripping to the solution. When the polymer components are collected as slurry by applying steam stripping or the like, the polymer components are dehydrated using an arbitrary dehydrator such as an extruder type squeezer to obtain a crumb having a water content of a predetermined value or less, and the crumb may be dried using an arbitrary dryer such as a band dryer or an expansion extrusion dryer. The block copolymer composition obtained as described above may be processed into pellets and the like according to a conventional method, and then may be supplied to the production of a hot melt adhesive composition or the like.

According to the production method described above, since the block copolymer A and the block copolymer B can be continuously obtained in the same reaction vessel, an intended block copolymer components can be obtained with extremely excellent productivity as compared with the case of individually producing the respective polymers and mixing them.

Also, according to the production method described above, since the weight average molecular weight of the aromatic vinyl polymer block Ar1 of the block copolymer A and the aromatic vinyl polymer block Ar3 of the block copolymer B can be substantially the same, the block copolymer composition with excellent compatibility of the block copolymer A with the block copolymer B can be obtained.

B. Adhesive Composition

The adhesive composition of the present invention comprises the block copolymer composition described above and a softening agent.

According to the present invention, the adhesive composition may have excellent die-cutting properties, softening agent anti-migration performance, mandrel properties and transparency by comprising the block copolymer composition described above.

The adhesive composition of the present invention comprises the block copolymer composition and a softening agent.

Each component in the adhesive composition of the present invention is hereinafter described.

Incidentally, the block copolymer composition may be in the same contents as those described in the section "A. Block copolymer composition" above; thus the descriptions herein are omitted.

1. Softening Agent

For the softening agent, for example, extender oil such as aromatic-based process oil, paraffinic-based process oil, and naphthene-based process oil; and liquid polymers such as polybutene and polyisobutylene can be used. Among these, extender oil such as paraffinic-based process oil and naphthene-based process oil is preferable as the softening agent.

The blending amount of the softening agent is preferably in a range of 5 parts by mass to 500 parts by mass, more preferably in a range of 10 parts by mass to 300 parts by mass, and particularly preferably in a range of 10 parts by mass to 150 parts by mass, per 100 parts by mass of the block copolymer composition of the present invention. If the softening agent is too little, the melt viscosity of the adhesive composition increases which tends to make the management difficult, and if it is too much on the contrary, the softening agent tends to easily bleed out.

2. Other Components

The adhesive composition of the present invention comprises at least the block copolymer composition and the softening agent, but may contain an additional component as required.

Examples of such an additional component may include compounding agents such as a tackifying resin, an elastomer other than the block copolymer A and the block copolymer B, and an antioxidant.

Such an additional compounding agent is hereinafter described.

(1) Tackifying Resin

Regarding the tackifying resin that is used in the present invention, conventionally known natural resin-based tackifying resins, synthetic resin-based tackifying resins and the like can be used.

Examples of the natural resin-based tackifying resin may include rosin-based resins and terpene-based resins.

Examples of the rosin-based resin may include rosins such as gum rosin, tall rosin, and wood rosin; modified rosins such as hydrogenated rosin, disproportionated rosin, and polymerized rosin; and rosin esters such as glycerin ester and pentaerythritol ester of modified rosin.

Examples of the terpene-based resin may include aromatic modified terpene resin, hydrogenated terpene resin, and terpene phenol resin in addition to α-pinene-based, β-pinene-based, and dipentene (limonene)-based terpene resins.

Synthetic resin-based tackifying resins may be classified roughly into polymer-based tackifying resins and condensation tackifying resins. Examples of the polymer-based tackifying resin may include petroleum resins such as an aliphatic-based (C5-based) petroleum resin, an aromatic-based (C9-based) petroleum resin, a copolymer-based (C5-C9-based) petroleum resin, a hydrogenated petroleum resin, and an alicyclic-based petroleum resin; a coumarone-indene resin; pure-monomer-based petroleum resins such as styrene-based and substituted styrene-based petroleum resins. Examples of the condensation tackifying resin may include phenol-based resins such as an alkylphenol resin and a rosin modified-phenol resin, and a xylene resin.

Among these, the petroleum resins are preferable, the aliphatic-based petroleum resin and the copolymer-based petroleum resin in which the copolymer amount of an aromatic-based monomer is 30% by mass or less are more preferable, and the copolymer-based petroleum resin in which the copolymer amount of an aromatic-based monomer is 25% by mass or less is particularly preferable.

The blending amount of the tackifying resin per 100 parts by mass of the block copolymer composition of the present invention is, usually in a range of 10 parts by mass to 500 parts by mass, preferably in a range of 50 parts by mass to 350 parts by mass, and more preferably in a range of 70 parts by mass to 250 parts by mass.

(2) Elastomer

The elastomer may be an elastomer other than the block copolymer A and the block copolymer B. Examples thereof may include styrene-butadiene-styrene block copolymer, styrene-ethylene-butylene-styrene block copolymer, styrene-ethylene-propylene-styrene block copolymer, polybutadiene, polyisoprene, and natural rubber.

The blending amount of the elastomer may be appropriately determined according to the properties of each elastomer and the required properties of the adhesive composition thus obtainable.

(3) Antioxidant

Examples of the antioxidant may include hindered phenolic compounds such as 2,6-di-t-butyl-p-cresol and pentaerythritol tetrakis[3-(3,5-di-t-butyl-4-hydroxyphenyl) propionate]; thiodicarboxylate esters such as dilauryl thiodipropionate and distearyl thiodipropionate; and phosphites such as tris(nonylphenyl) phosphite and 4,4'-butylidene-bis(3-methyl-6-t-butylphenil)ditridecyl phosphite.

The blending amount of the antioxidant may be appropriately determined according to the properties of each antioxidant and the required properties of the adhesive composition thus obtainable.

3. Adhesive Composition

The adhesive composition of the present invention comprises at least the block copolymer composition and a softening agent, and as required, includes compounding agents such as a tackifying resin, an elastomer other than the block copolymer A and the block copolymer B, and an antioxidant. In addition, other compounding agents such as a wax, a thermal stabilizer, an ultraviolet absorber, and a filler can be further added.

Incidentally, the adhesive composition of the present invention is preferably a solventless composition that does not include any solvent.

The adhesive composition of the present invention may be produced by mixing the block copolymer composition and the softening agent, and as required, a material such as a compounding agent.

There are no particular limitations on the method for producing the adhesive composition and a conventionally known method can be adopted; for example, a method to produce the adhesive composition by melt mixing the various components at approximately 160° C. to 180° C. under nitrogen atmosphere can be adopted.

The applications of the adhesive composition of the present invention is not particularly limited, and can be used for various adhesions; however, among them, the adhesive composition is particularly suitably used as an adhesive for labels. For example, the adhesive composition of the present invention is melted by heating, subsequently cut with a die to a certain size, subsequently applied on a paper substrate such as high quality paper, art paper, cast paper, thermal paper or foil paper; and a film substrate such as a synthetic resin film of polyethylene terephthalate, or a Cellophane film, or applied on a release paper, and then transferred to a substrate. Thus, a label is produced. Since the adhesive composition of the present invention has satisfactory softening agent anti-migration performance and die-cutting properties, the adhesive composition contributes to a reduction of defective product ratio and to an increase in productivity in the production of such a label. Furthermore, the label thus obtainable has excellent mandrel properties and transparency.

The applications of the labels thus obtainable are not particularly limited, but for example, the labels can be used as product labels for the container packaging of foods, beverages and alcoholic beverages, or as variable information labels. The labels can also be used as labels for logistics, electrical/precision instruments, pharmaceutics/medicine, cosmetics/toiletries, stationeries/office appliances, and automobiles.

The present invention is not limited to the embodiments. The embodiments are exemplifications, and any other variations are intended to be included in the technical scope of the present invention if they have substantially the same constitution as the technical idea described in the claim of the present invention and offer similar operation and effect thereto.

EXAMPLES

Hereinafter, the present invention will be more specifically described by way of Examples and Comparative Examples. Incidentally, unless particularly stated otherwise, parts and percentage (%) in the various Examples are on a mass basis.

Various measurements were carried out by the following methods.

[Weight Average Molecular Weight of Block Copolymer Composition and Various Block Copolymers in Block Copolymer Composition]

The weight average molecular weight was determined as a molecular weight calculated relative to polystyrene standards, by high performance liquid chromatography using tetrahydrofuran as a carrier at a flow rate of 0.35 ml/min. The measurement was carried out using an HLC8220™ manufactured by Tosoh Corp. as an apparatus, with three connected columns of SHODEX™ KF-404HQ manufactured by Showa Denko K.K. (column temperature 40° C.), and a differential refractometer and an ultraviolet detector as detectors, and using twelve samples of polystyrene standards (from 500 to 3,000,000) manufactured by Polymer Laboratories, Ltd. for the calibration of the molecular weight.

[Content of Various Block Copolymers in Block Copolymer Composition]

The content was determined from the area ratio of peaks corresponding to the various block copolymers in the charts obtained by high performance liquid chromatography as described above.

[Weight Average Molecular Weight of Styrene Polymer Block of Block Copolymer]

A block copolymer was caused to react with ozone according to the method described in Rubber Chem. Technol., 45, 1295 (1972), and was reduced using lithium aluminum hydride, and thereby an isoprene polymer block of the block copolymer was decomposed. Specifically, the process was carried out by the following procedure. That is, 300 mg of a sample was dissolved in a reaction vessel containing 100 ml of dichloromethane that had been treated with a molecular sieve. This reaction vessel was placed in a cooling tank, and from −25° C., ozone generated by an ozone generator was introduced into the reaction vessel while oxygen was allowed to flow thereinto at a flow rate of 170 ml/min. After 30 minutes from the initiation of the reaction, it was checked whether the reaction had ended by introducing the gas discharged out from the reaction vessel into an aqueous solution of potassium iodide. Subsequently, 50 ml of diethyl ether and 470 mg of lithium aluminum hydride were introduced into another reaction vessel that had been purged with nitrogen, and while the reaction vessel was cooled with ice water, the solution that had reacted with ozone was slowly added dropwise to this reaction vessel. Then, the reaction vessel was placed in a water bath to raise the temperature slowly, and the reaction solution was refluxed at 40° C. for 30 minutes. Thereafter, dilute hydrochloric acid was added dropwise in small amounts while the solution was stirred, and dropwise addition was continued until generation of hydrogen was almost not recognized. After this reaction, the solid product generated in the solution was separated by filtration, and the solid product was extracted with 100 ml of diethyl ether for 10 minutes. This extract was combined with the filtrate obtained at the time of separation by filtration, and the solvent was distilled off. Thus, a solid sample was obtained. For the sample obtained as such, the weight average molecular weight was measured according to the method for measuring the weight average molecular weight described above, and the value was designated as the weight average molecular weight of the styrene polymer block.

[Weight Average Molecular Weight of Isoprene Polymer Block of Block Copolymer]

The weight average molecular weight of the corresponding styrene polymer block was subtracted from the weight average molecular weight of each block copolymer determined as described above, and the weight average molecular weight of the isoprene polymer block was determined based on the calculation value.

[Styrene Unit Content of Block Copolymer]

The styrene unit content was determined based on the ratio between the detection intensities of a differential refractometer and an ultraviolet detector in the analysis by high performance liquid chromatography described above. Incidentally, copolymers having different styrene unit contents were prepared in advance, and a calibration curve was produced using those.

[Styrene Unit Content of Block Copolymer Composition (Overall)]

The styrene unit content was determined based on a proton NMR analysis.

[Tensile Property of Block Copolymer Composition]

The block copolymer composition sheet that was pressure-molded at 170° C. and has a thickness of 0.7 mm was used to measure the breaking strength upon cutting thereof (breaking strength) and the breaking elongation upon cutting thereof (breaking elongation) at the elastic stress rate of 100 m/min, according to JIS K 6251. A dumbbell shape of JIS-7113-2 (½ size) was used. As the values of both the breaking strength and the breaking elongation are smaller, the label has superior die-cutting properties. Incidentally, a high speed peeling tester "TE-701 high speed peeling tester 100mTYPE" manufactured by TESTER SANGYO CO., LTD. was used for the measurement.

[Transparency of Adhesive Composition for Label]

An adhesive composition for label that was used as a sample was dissolved in dehydrated toluene, and thus a 25% solution was obtained. For this solution, the visible light transmittance was measured using a "Hitachi Spectrophotometer U-3010™" manufactured by Hitachi High-Technologies Corp. as an analyzer, and using a 10-mm quartz cell as a cell. A larger value of this visible light transmittance indicates superior transparency.

[Softening Agent Anti-Migration Performance of Adhesive Composition for Label]

An adhesive tape as a sample was pasted on high quality paper, and then the paper was cut to a size of 50×50 mm. This adhesive tape was inserted between A4-sized glass plates, and such plural glass plates were stacked, and thereby the load was adjusted to be 2 kg. Subsequently, the glass plate was left to stand for 72 hours in air at 80° C., and was thereby subjected to aging. For this sample, the brightness (L) values at the high quality paper surface before and after the aging were measured, and the value (%) of L(before aging)/L(after aging)×100 was calculated. As this value is larger, the adhesive composition has superior softening agent retaibability. Incidentally, the brightness measurement was carried out by a reflection method using an "S & M Colour Computer Model SM-7T" manufactured by Suga Test Instruments Co., Ltd.

[Initial Tack Strength of Adhesive Composition for Label]

An adhesive tape having a width of 25 mm was used as a sample, and the loop tack (N/25 mm) was evaluated by a tensile tester using a hard polyethylene (HDPE) plate as a body to be adhered, at the test speed of 1000 mm/min, with the adhesion section of 25×25 mm, and at the temperature of 23° C. As the value is larger, the adhesive composition for label has superior initial tack strength.

[Holding Power of Adhesive Composition for Label]

An adhesive tape having a width of 10 mm was used as a sample, a mirror SUS plate was used as a body to be adhered, and thereby the holding power was evaluated according to PSTC-6 (a holding power testing method defined by the American Pressure-Sensitive Tape Council), based on the time (minutes) taken until an adhesion section having a size of 10×25 mm was detached at a temperature of 50° C. under a load of $3.92 \times 10^4$ Pa. A larger value indicates superior holding power and mandrel properties.

Example 1

In a pressure-resistant reactor, 23.3 kg of cyclohexane, 3.50 millimoles of N,N,N',N'-tetramethylethylenediamine (hereinafter, referred to as TMEDA), and 1.75 kg of styrene were introduced, and while the content was stirred at 40° C., 116.7 millimoles of n-butyllithium was added thereto. Polymerization was carried out for one hour while the temperature was increased to 50° C. The polymerization conversion ratio of styrene was 100%. Subsequently, 7.0 kg of isoprene was continuously added to the reactor over one hour while the temperature was controlled to be maintained at 50° C. to 60° C. After the addition of isoprene was completed, polymerization was carried out for another one hour. The polymerization conversion ratio of isoprene was 100%. Next, 82.3 millimoles of methanol was added thereto as a polymerization terminator, the partial termination reaction was carried out for half an hour, and thus, a styrene-isoprene diblock copolymer (B) was formed. Thereafter, 1.25 kg of styrene was continuously added thereto over half an hour while the temperature was controlled to be maintained at 50° C. to 60° C. After the addition of styrene was completed, polymerization was carried out for another one hour, and thus a styrene-isoprene-styrene triblock copolymer (A) was formed. The polymerization conversion ratio of styrene was 100%. Thereafter, 233.4 millimoles of methanol as a polymerization terminator was added thereto and mixed thoroughly therein to terminate the reaction. Incidentally, the amounts of the various reagents used in the reaction are summarized in Table 1. To 100 parts of the reaction liquid obtained as described above (including 36 parts of polymer components), 0.36 part of 2,6-di-t-butyl-p-cresol was added and mixed as an antioxidant, and the mixed solution was added dropwise in small amounts to hot water that had been heated to 85° C. to 95° C. to thereby volatilize the solvent, and thus a separating material was obtained. This separating material was pulverized and dried in hot air at 85° C., and thus a composition (block copolymer composition) of Example 1 was collected. Incidentally, a portion of the obtained reaction liquid was taken, and the weight average molecular weight of the block copolymer composition (overall), the weight average molecular weights of the various block copolymers contained in the composition, the content of the various block copolymers in the block copolymer composition, the weight average molecular weights of the styrene polymer blocks of the various block copolymers, the weight average molecular weights of the isoprene polymer blocks of the various block copolymers, the styrene unit contents of the various block copolymers, and the styrene unit content of the block copolymer composition (overall) were determined. Also, the obtained block copolymer composition was pressure-molded at 170° C. to produce a sheet having a thickness of 0.7 mm, and the tensile property thereof was evaluated. The result is presented in Table 2.

Examples 2 to 3

The compositions for Examples 2 and 3 were collected in the same manner as in Example 1, except that the amount of styrene, n-butyllithium, TMEDA, isoprene, and methanol was respectively changed as shown in Table 1. The same measurements as in Example 1 were carried out for the compositions for Examples 2 and 3. The results are presented in Table 2.

Comparative Example 1

In a pressure-resistant reactor, 23.3 kg of cyclohexane, 3.75 millimoles of TMEDA and 1.7 kg of styrene were introduced, and while the content was stirred at 40° C., 125.0 millimoles of n-butyllithium was added thereto. Polymerization was carried out for one hour while the temperature was increased to 50° C. The polymerization conversion ratio of styrene was 100%. Subsequently, 8.4 kg of isoprene was continuously added to the reactor over one hour while the temperature was controlled to be maintained at 50° C. to 60° C. After the addition of isoprene was completed, polymerization was carried out for another one hour. The polymerization conversion ratio of isoprene was 100%. Next, 27.50 millimoles of dimethyldichlorosilane (bifunctional coupling agent) was added thereto as a coupling agent, and coupling reaction was carried out for two hours, thereafter 187.5 millimoles of methanol as a polymerization terminator was added to the reactor and termination reaction was carried out for one hour. The amounts of the various reagents used in the reaction are summarized in Table 1. A portion of the reaction liquid thus obtained was taken, and the same measurements as in Example 1 were carried out. These values are presented in Table 2. To 100 parts of the reaction liquid obtained as described above (including 30 parts of polymer components), 0.3 part of 2,6-di-t-butyl-p-cresol was added and mixed as an antioxidant, and the mixed solution was added dropwise in small amounts to hot water that had been heated to 85° C. to 95° C. to thereby volatilize the solvent, and thus a separating material was obtained. This separating material was pulverized and dried in hot air at 85° C., and thus a composition for Comparative Example 1 was collected. The tensile property of the obtained composition was evaluated in the same manner as in Example 1. The result is presented in Table 2.

Comparative Example 2

In a pressure-resistant reactor, 23.3 kg of cyclohexane, 2.50 millimoles of TMEDA and 0.9 kg of styrene were introduced, and while the content was stirred at 40° C., 83.33 millimoles of n-butyllithium was added thereto. Polymerization was carried out for one hour while the temperature was increased to 50° C. The polymerization conversion ratio of styrene was 100%. Subsequently, 8.2 kg of isoprene was continuously added to the reactor over one hour while the temperature was controlled to be maintained at 50° C. to 60° C. After the addition of isoprene was completed, polymerization was carried out for another one hour. The polymerization conversion ratio of isoprene was 100%. Next, 0.9 kg of styrene was further added thereto to carry out the reaction, thereafter 125.0 millimoles of methanol as a polymerization terminator was added to the reactor and termination reaction was carried out for one hour. The amounts of the various reagents used in the reaction are summarized in Table 1. A portion of the reaction liquid thus obtained was taken, and the same measurements as in Example 1 were carried out. These values are presented in Table 2. To 100 parts of the reaction liquid obtained as described above (including 30 parts of polymer components), 0.3 part of 2,6-di-t-butyl-p-cresol was added and mixed as an antioxidant, and the mixed solution was added dropwise in small amounts to hot water that had been heated to 85° C. to 95° C. to thereby volatilize the solvent, and thus a separating material was obtained. This separating material was pulverized and dried in hot air at 85° C., and thus a composition for Comparative Example 2 was collected. The tensile property of the obtained composition was evaluated in the same manner as in Example 1. The result is presented in Table 2.

Comparative Example 3-1

The composition for Comparative Example 3-1 was collected in the same manner as in Comparative Example 1, except that the amount of styrene, n-butyllithium, TMEDA, isoprene, dimethyldichlorosilane and methanol was respectively changed as shown in Table 1. The same measurements as in Example 1 were carried out for the composition for Comparative Example 3-1 after mixing thereof with the composition for Comparative Example 3-2. The results are presented in Table 2.

Comparative Example 3-2

In a pressure-resistant reactor, 23.3 kg of cyclohexane and 12.50 millimoles of TMEDA were introduced, and while the content was stirred at 40° C., 416.67 millimoles of n-butyllithium was added thereto, and 10.0 kg of isoprene was continuously added thereto over one hour while the temperature was controlled to be maintained at 50° C. to 60° C. After the addition of isoprene was completed, polymerization was carried out for another one hour, and thus polyisoprene homopolymer was formed. The polymerization conversion ratio of isoprene was 100%. Thereafter, 625.01 millimoles of methanol as a polymerization terminator was added thereto and mixed thoroughly therein to terminate the reaction. Incidentally, the amounts of the various reagents used in the reaction are summarized in Table 1. To 100 parts of the reaction liquid obtained as described above (including 30 parts of polymer components), 0.3 parts of 2,6-di-t-butyl-p-cresol was added and mixed as an antioxidant, and the mixed solution was vacuum dried at 60° C., and thus the composition (polyisoprene) for Comparative Example 3-2 was collected. The same measurements as in Example 1 were carried out for the composition for Comparative Example 3-2 after mixing thereof with the composition for Comparative Example 3-1. The results are presented in Table 2. Incidentally, in Table 2, the composition obtained by mixing the composition for Comparative Example 3-1 (70 parts) with the composition for Comparative Example 3-2 (30 parts) was used and the result thus obtained is presented as Comparative Example 3.

TABLE 1

| | | Example 1 | Example 2 | Example 3 | Comparative Example 1 | Comparative Example 2 | Comparative Example 3-1 | Comparative Example 3-2 |
|---|---|---|---|---|---|---|---|---|
| cyclohexane (kg) | | 23.3 | 23.3 | 23.3 | 23.3 | 23.3 | 23.3 | 23.3 |
| TMEDA (millimol) | | 3.50 | 3.69 | 3.19 | 3.75 | 2.50 | 5.45 | 12.5 |
| n-butyllithium (millimol) | | 116.7 | 123.0 | 106.4 | 125.0 | 83.3 | 181.8 | 416.67 |
| styrene (kg) | [First polymerization] | 1.75 | 2.15 | 1.65 | 1.70 | 0.9 | 2.6 | — |
| isoprene (kg) | [Second polymerization] | 7.0 | 7.20 | 7.50 | 8.4 | 8.2 | 7.4 | 10.0 |
| methanol (millimol) | [After second polymerization] | 82.3 | 91.05 | 74.45 | — | — | — | — |
| dimethyldichlorosilane (millimol) | [After second polymerization] | — | — | — | 27.50 | — | 86.36 | — |
| styrene (kg) | [Third polymerization] | 1.25 | 0.65 | 0.85 | — | 0.9 | — | — |
| methanol (millimol) | [When polymerization completed] | 233.4 | 246.1 | 212.7 | 187.5 | 125.0 | 272.73 | 625.01 |

TABLE 2

| | | Example 1 | Example 2 | Example 3 | Comparative Example 1 | Comparative Example 2 | Comparative Example 3 |
|---|---|---|---|---|---|---|---|
| Block copolymer composition | Weight average molecular weight of overall block copolymer composition (×10^3) | 130.6 | 121.5 | 140.0 | 171.4 | 162.0 | 118.1 |
| | Weight average molecular weight of triblock copolymer (A) (×10^3) | 159.5 | 144.0 | 165.0 | 238.0 | 162.0 | 155.7 |
| | Weight average moleclar weight of diblock copolymer (B) (×10^3) | 112.5 | 114.0 | 129.0 | 115.1 | 0.0 | 0.0 |
| | Weight average molecular weight of styrene polymer block (Ar1) in triblock copolymer (A) (×10^3) | 15.8 | 18.0 | 16.0 | 13.2 | 10.9 | 15.4 |
| | Weight average molecular weight of styrene polymer block (A2) in triblock copolymer (A) (×10^3) | 47.0 | 30.0 | 36.0 | 13.2 | 10.9 | 15.4 |
| | Weight average molecular weight of styrene polymer block (Ar3) in diblock copolymer (B) (×10^3) | 15.8 | 13.2 | 16.0 | 13.2 | — | — |
| | Styrene unit content of triblock copolymer (A) (%) | 44.4 | 38.0 | 40.0 | 16.5 | 18.0 | 26.5 |
| | Styrene unit content of diblock copolymer (B) (%) | 20.0 | 23.0 | 18.0 | 16.5 | — | — |
| | Mw(Ar2)/Mw(Ar1) | 3.0 | 1.7 | 2.3 | 1.0 | 1.0 | 1.0 |
| | Weight average molecular weight of isoprene polymer block (D1) in triblock copolymer (A) (×10^3) | 96.7 | 96.0 | 113.0 | 211.6 | 140.3 | 124.9 |
| | Weight average molecular weight of isoprene polymer block (D2) in diblock copolymer (B) (×10^3) | 96.7 | 96.0 | 113.0 | 101.9 | — | — |
| | Styrene unit content of overall block copolymer composition (%) | 30.2 | 28.0 | 25.0 | 16.5 | 18.0 | 18.5 |
| | Content of triblock copolymer (A) (%) | 38.0 | 25.0 | 30.0 | 46.0 | 100.0 | 70.0 |
| | Content of diblock copolmer (B) (%) | 62.0 | 75.0 | 70.0 | 54.0 | 0.0 | 0.0 |
| | Content of other component (%) | 0 | 0 | 0 | 0 | 0 | Polyisoprene (Mw40000) 30 |
| Tensile property | | | | | | | |
| | Breaking strength [MPa] | 6.5 | 5.9 | 4.9 | 9.5 | 31.0 | 2.5 |
| | Breaking elongation [%] | 1150.0 | 890.0 | 1100.0 | 1750.0 | 2500.0 | 1450.0 |

Example 4

Introduced was 100 parts of the composition obtained in Example 1 into a stirring blade type kneading machine, and 150 parts of a tackifying resin (trade name: "QUINTONE (registered trademark) D100", aliphatic aromatic copolymer-based hydrocarbon resin, manufactured by Zeon Corp.), 50 parts of a softening agent (trade name "SUNPURE N90", naphthene-based process oil manufactured by NIHONKO-SAN CO., LTD.), and 3 parts of an antioxidant (trade name "IRGANOX (registered trademark) 1010", manufactured by BASF Corp.) were added thereto. The interior of the system was purged with nitrogen gas, and then the mixture was kneaded for one hour at 160° C. to 180° C. Thus, an adhesive composition for label for Example 4 was produced. The said adhesive composition for label was used as a sample and the transparency thereof was evaluated. Next, the adhesive composition for label thus obtained was applied on a polyester film having a thickness of 25 μm, and the sample thus obtained (adhesive tape), softening agent anti-migration performance, initial tack strength, and holding power were evaluated. The results are presented in Table 3.

Examples 5 to 6, Comparative Examples 4 to 6

Adhesive compositions for label for Examples 5 to 6 and Comparative Examples 4 to 6 were produced in the same manner as in Example 4, except that the compositions for Examples 2 to 3 and Comparative Examples 1 to 3 were respectively used. The adhesive compositions thus obtained were evaluated in the same manner as in Example 4. The results are presented in Table 3.

TABLE 3

| | Example 4 | Example 5 | Example 6 | Comparative Example 4 | Comparative Example 5 | Comparative Example 6 |
|---|---|---|---|---|---|---|
| Visible light transmittance [%] | 70.0 | 68.0 | 70.0 | 54.0 | 69.0 | 51.0 |
| Softening agent retainability [%] | 98.0 | 97.0 | 97.0 | 80.0 | 85.0 | 75.0 |
| Looptack [N/25 mm] (1000 mm/min HDPE 23° C.) | 4.1 | 4.9 | 5.0 | 4.5 | 3.0 | 4.1 |
| Holding power [minute] (SUS 50° C., 10 mm × 25 mm) | 145.0 | 110.0 | 95.0 | 60.0 | 120.0 | 10.0 |

Followings can be seen from Table 2 and Table 3. That is, the adhesive composition for label of the present invention mainly comprises the block copolymer composition of the present invention that shows low breaking strength and breaking elongation; thus, the transparency and softening agent anti-migration performance are excellent, and also, the initial tack strength and holding power are favorable, and it can be seen that both the adhesiveness and the die-cutting properties are excellent (Examples 4 to 6). On the contrary, the adhesive compositions for label not containing the block copolymer composition of the present invention are inferior in the balance of the product properties (Comparative Examples 4 to 6).

The invention claimed is:

1. A block copolymer composition comprising:
   a block copolymer A represented by the following formula (I); and
   a block copolymer B represented by the following formula (II); wherein:
   a content of an aromatic vinyl monomer unit of the block copolymer A is more than a content of an aromatic vinyl monomer unit of the block copolymer B;
   a ratio (Mw(Ar3)/Mw(Ar1)) of a weight average molecular weight of an aromatic vinyl polymer block Ar3 (Mw(Ar3)) of the block copolymer B to a weight average molecular weight of an aromatic vinyl polymer block Ar1 (Mw(Ar1)) of the block copolymer A is in a range of 0.95 to 1.05;
   a ratio (Mw(Ar2)/Mw(Ar1)) of a weight average molecular weight of an aromatic vinyl polymer block Ar2 (Mw(Ar2)) to the weight average molecular weight of the aromatic vinyl polymer block Ar1 (Mw(Ar1)) is in a range of 3.0 to 5;
   breaking strength of the block copolymer composition is 8 MPa or less, wherein the breaking strength of the block copolymer composition is obtained by using a 0.7 mm thick sheet of the block copolymer composition pressure-molded at 170° C., and measuring the tensile strength upon cutting at the elastic stress rate of 100 m/min according to JIS K 6251; and
   breaking elongation of the block copolymer composition is 2000% or less, wherein the breaking elongation of the block copolymer composition is obtained by using a 0.7 mm thick sheet of the block copolymer composition pressure-molded at 170° C., and measuring the elongation upon cutting at the elastic stress rate of 100 m/min according to JIS K 6251:

$$Ar1-D1-Ar2 \tag{I}$$

$$Ar3-D2 \tag{II}$$

in the formula (I) and the formula (II), Ar1, Ar2, and Ar3 each represents an aromatic vinyl polymer block; and D1 and D2 each represents a conjugated diene polymer block.

2. The block copolymer composition according to claim 1, wherein the block copolymer B is prepared at the same time when the block copolymer A is prepared.

3. The block copolymer composition according to claim 1, wherein halogen content in the block copolymer composition is 0.5% by mass or less.

4. An adhesive composition comprising:
   the block copolymer composition according to claim 1; and
   a softening agent.

5. The block copolymer composition according to claim 1, wherein
   the ratio (Mw(Ar3)/Mw(Ar1)) of the weight average molecular weight of the aromatic vinyl polymer block Ar3 (Mw(Ar3)) of the block copolymer B to the weight average molecular weight of the aromatic vinyl polymer block Ar1 (Mw(Ar1)) of the block copolymer A is in a range of 0.98 to 1.02.

* * * * *